United States Patent [19]

Lange et al.

[11] Patent Number: 4,493,006

[45] Date of Patent: Jan. 8, 1985

[54] GAS DISCHARGE OVERVOLTAGE ARRESTER WITH PARALLEL-CONNECTED SPARK GAP

[75] Inventors: Gerhard Lange; Jürgen Boy; Ernst-Ludwig Hoene; Oskar Sippekamp, all of Berlin, Fed. Rep. of Germany

[73] Assignee: Siemens Aktiengesellschaft, Berlin and Munich, Fed. Rep. of Germany

[21] Appl. No.: 580,759

[22] Filed: Feb. 17, 1984

Related U.S. Application Data

[63] Continuation of Ser. No. 332,654, Dec. 21, 1981, abandoned.

[30] Foreign Application Priority Data

May 7, 1981 [DE] Fed. Rep. of Germany ....... 3118137

[51] Int. Cl.$^3$ .............................................. H02H 9/06

[52] U.S. Cl. .................................. 361/124; 361/119; 361/120; 337/32; 337/33; 313/325

[58] Field of Search ............... 361/120, 124, 125, 129, 361/119, 117, 118; 337/15, 17, 18, 31, 32, 33, 28; 313/306, 325, 231.1

[56] References Cited

U.S. PATENT DOCUMENTS 4,405,967 9/1983 Cwirzen ............................. 361/124

*Primary Examiner*—Patrick R. Salce

*Attorney, Agent, or Firm*—Herbert L. Lerner; Laurence A. Greenberg

[57] ABSTRACT

Overvoltage arrester having a gas-filled housing, including two overvoltage arrester electrodes disposed across from each other in the housing, a tubular insulator body spacing the overvoltage arrester electrodes apart from each other, a ring-shaped flange integral with one of the overvoltage arrester electrodes forming a first spark gap electrode, a ring-shaped metal cap forming a second spark gap electrode being superimposed on the first spark gap electrode and pressed in on the tubular insulator body, the first and second spark gap electrodes forming a spark gap having a given clearance therebetween, and a contact spring connecting the second spark gap electrode to the other of the overvoltage arrester electrodes.

9 Claims, 3 Drawing Figures

GAS DISCHARGE OVERVOLTAGE ARRESTER WITH PARALLEL-CONNECTED SPARK GAP

This application is a continuation of application Ser. No. 332,654, filed Dec. 21, 1981 now abandoned.

The invention relates to an overvoltage arrester or protector having a gas filled housing with electrodes disposed therein being spaced apart from each other by a tubular insulator body, the first electrode of a spark gap or arrester being formed by a ring flange connected to one of the electrodes, and the second electrode of the spark gap being formed by a ring-shaped metal part placed thereon, the second electrode of the spark gap being interconnected with the other electrode of the overvoltage arrester by a contact spring.

Such an overvoltage arrester with a spark gap is known from German Published, Non-Prosecuted Application DE-OS No. 27 40 695. This device involves a combination of two protective systems being employed such as for the protection of telephone installations against overvoltages, wherein a gas discharge-overvoltage arrester in particular takes over the actual protection, and a spark gap being connected in parallel thereto operates as a coarse protector device. Upon the occurence of a boost in the threshold d.c. voltage of the gas discharge overvoltage arrester, the spark gap takes over the coarse protection with a preset higher voltage threshold. The drawback of the known combination of a gas discharge overvoltage arrester with a spark gap is that the air gap of about 0.1 mm has a dual function including that of an insulator gap. This means that discharges preferably fire at the edge of recesses in the insulator ring disks to produce conductive coatings there and accordingly insulator leaks. This places a question on the loading capacity and consequently on the operability of this arrangement.

It is accordingly an object of the invention to provide a gas discharge overvoltage arrester with parallel-connected spark gap protector, which overcomes the hereinafore-mentioned disadvantages of the heretofor-known devices of this general type, and to create a suitable spark gap, which in combination with a gas filled overvoltage arrester, can be employed in a pre-existing setting, and which excels in providing for a low threshold surge voltage.

With the foregoing and other objects in view there is provided, in accordance with the invention, an overvoltage arrester having a gas-filled housing, comprising two overvoltage arrester electrodes disposed across from each other in the housing, a tubular insulator body spacing the overvoltage arrester electrodes apart from each other, a ring-shaped flange integral with one of the overvoltage arrester electrodes forming a first spark gap electrode, a ring-shaped metal cap forming a second spark gap electrode being superimposed on the first spark gap electrode and pressed in on the tubular insulator body, the first and second spark gap electrodes forming a spark gap having a given defined clearance therebetween due to the extent that the cap is pressed on, and a contact spring connecting the second spark gap electrode to the other of the overvoltage arrester electrodes.

In accordance with another feature of the invention, the cap is formed of brass.

In accordance with a further feature of the invention, the given clearance of the spark gap is 0.09 mm.

In accordance with again another feature of the invention, to maintain this clearance at an annularly uniform distance, for best results the cap has an inwardly bulging shape, or the cap is inwardly arched in vicinity of the spark gap.

The pressed-on position of the preferably brass cap with respect to the insulator body produces an air gap between the brass cap and first electrode (or core electrode) amounting to about 0.09 mm. The cap is connected to ground by touching the contact spring. This produces a spark gap connected in parallel with gas-filled overvoltage arrester having a threshold voltage of about 400 volts d-c, with a higher-stepped threshold voltage of about 600 volts d-c for coarse protection. The cap, being of a thick-walled, stable type, preferably has four surfaces formed thereon with a uniform peripheral interspacing thereof, which aids pressing on to the insulator body. Therefore, in accordance with an added feature of the invention, the cap has four surfaces formed thereon, being uniformly distributed about the periphery thereof. The outer surface area of the insulator body may be formed of a ceramic material and be frustoconically tapered so as to facilitate pressing-on the cap.

To advantageously reduce the threshold surge voltage, in accordance with an additional feature of the invention, the cap forming the second spark gap electrode and the first spark gap electrode or core electrode have oppositely disposed surfaces formed thereon, and at least one of the surfaces is roughened, e.g., by sand-blasting. The points generated thereby effectively boost the field strength.

For further advantageous results, an additional reduction in threshold surge voltage is produced, if in accordance with yet another feature of the invention the cap has an inner surface and the first spark gap electrode or core electrode has a surface disposed opposite the inner surface, and including a thin graphite layer disposed on at least one of the surfaces, e.g., by abrasive means.

To press the metal cap on to the insulator body at a defined clearance of preferably 0.09 mm, a certain technical measurement input is required, which however can be reduced according to a further development of the invention by using a stepped or shouldered type of metal cap, so that the clearance of 0.09 mm can be limited by the precisely dimensioned thickness of an insulating foil inserted at the shoulder, such as a synthetic film material. Therefore, in accordance with yet a further feature of the invention, there is provided an insulating foil maintaining the clearance of the spark gap, the foil being disposed beyond the spark gap and centrally disposed between the spark gap electrodes.

In accordance with yet an added feature of the invention, there is provided a tubular holder, the contact springs having outer surfaces being in the form of means for centering the overvoltage arrester in the holder.

In accordance with a concomitant feature of the invention, the tubular insulator body has an inner wall, and including at least one coating of electrically conductive material serving as a firing bar being disposed on the inner wall and extended from the first spark gap electrode or core electrode toward the oppositely disposed other of the overvoltage arrester electrodes.

Other features which are considered as characteristic for the invention are set forth in the appended claims.

Although the invention is illustrated and described herein as embodied in a gas discharge overvoltage arrester with parallel-connected spark gap protector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
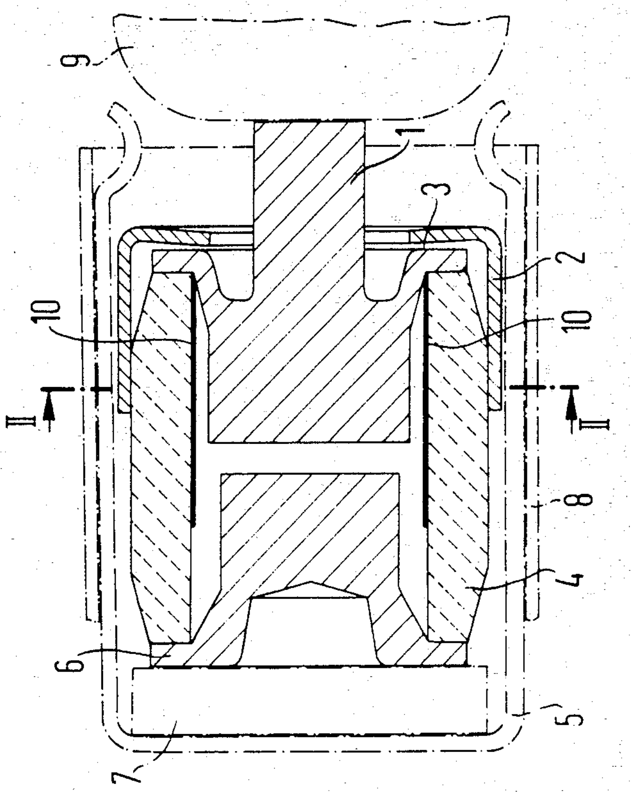
FIG. 1 is a fragmentary, diagrammatic, longitudinal-sectional view of a first embodiment of an overvoltage protector or arrester with a spark gap or surge arrester.

Referring now to the figures of the drawing and first particularly to FIG. 1 thereof, it is seen that the overvoltage protector or arrester includes a gas-filled housing, preferably a noble gas filled housing, in which electrodes 1, 6 which are spaced apart by a tubular insulator body 4, are disposed opposite each other. The first electrode 1, and a second electrode in the form of a ring-shaped metal cap 2 being superposed thereon and preferably being formed of brass material, form the spark gap or arrester 3. The ring-shaped cap 2 of the spark gap 3 is connected to the other electrode 6 of the overvoltage arrester by a soft solder pellet or pill 7 and contact springs 5. The contact springs 5 are constructed as a cage or holder, on the bottom of which the soft solder pellet 7 is seated. Under a non-illustrated spring load, the contact spring cage 5 is compressed against an outer contact piece 9, and in that way the overvoltage arrester and the soft solder pellet 7 form a good contact. The soft solder pellet 7 in conjunction with the contact springs 5 provided for a so-called fail safe response. If, upon diverting an overvoltage, the soft solder pellet heats up to the melting point by diverted power dissipation, then the outer spring force compresses the contact springs 5 against the contact piece 9. The contact made between the contact springs 5 and contact piece 9 produces a safe short circuit, through which the contact piece 9 is connected to ground. On the outside thereof, the spring contacts 5 serve as centering means within a tubular part 8 constructed as an outer cage.

The cap 2 is pressed in on the tubular insulator body 4 to the extent that the electrodes 1, 2 form a spark gap or arrester 3 having a defined clearance.

At least one coating bar of electrically conductive material extends on the inner wall of the tubular insulator body 4 in the form of a firing bar 10, from the first electrode 1 toward the opposite arrester electrode 6. At least one of the oppositely disposed surfaces of the spark gap electrodes 1, 2 may be roughened or have a thin graphite layer disposed thereon.

Figure 2:
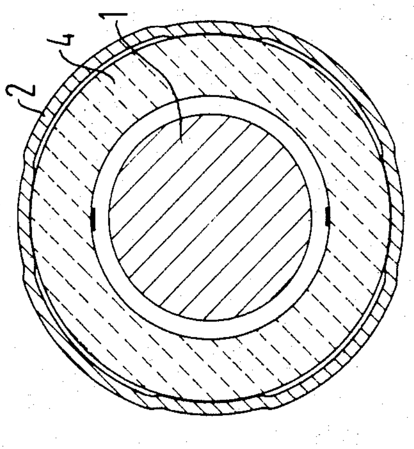
FIG. 2 is a cross-sectional view taken along the line II—II in FIG. 1 in the direction of the arrows.

FIG. 2 shows a preferred construction of the cap 2. The cap 2 has four formed-on surfaces, which are uniformly distributed over its periphery.

Figure 3:
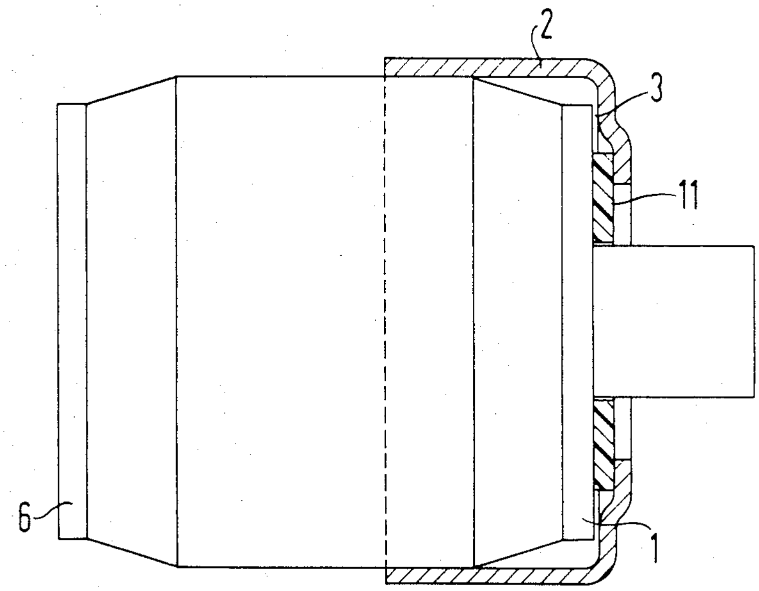
FIG. 3 is a view similar to FIG. 2 of a further embodiment of an overvoltage arrester with a spark gap or surge arrester.

In the embodiment shown in FIG. 3, the overvoltage arrester with its electrodes 1 and 6 is illustrated in a purely diagrammatic way. The cap 2 and an insulating foil 11 are shown in cross-section. In this embodiment the cap 2 has a stepped or arched shape. When pressing in on the cap 2, the clearance of the spark gap 3 between the first electrode 1 of the overvoltage arrester and the cap 2 is maintained by the insulating foil 11 which is preferably plastic, is beyond the spark gap 3, and is centrally disposed between the electrodes 1, 2.

We claim:

1. Overvoltage arrester having a gas-filled housing, comprising two overvoltage arrester electrodes disposed across from each other in the housing, a tubular insulator body spacing said overvoltage arrester electrodes apart from each other so as to define an isolating gap therebetween, a ring-shaped flange integral with one of said overvoltage arrester electrodes and forming a first spark gap electrode, a ring-shaped metal cap having an annular, radially inward projecting flange, said inward projecting flange surrounding and spaced from said first spark gap electrode and pressed onto said tubular insulator body, and a contact spring connecting said metal cap to the other of said overvoltage arrester electrodes, said metal cap inward projecting flange forming a second spark gap electrode defining with said first spark gap electrode a spark gap having a defined clearance therebetween smaller than the clearance of said isolating gap, said cap being inwardly arched in the vicinity of said spark gap.

2. Overvoltage arrester according to claim 1, wherein said cap is formed of brass.

3. Overvoltage arrester according to claim 1, wherein said given clearance of said spark gap is 0.09 mm.

4. Overvoltage arrester according to claim 1, including an insulating foil maintaining said clearance of said spark gap, said foil being disposed beyond said spark gap and centrally disposed between said spark gap electrodes.

5. Overvoltage arrester according to claim 1, wherein said cap has four surfaces formed thereon uniformly distributed about the periphery thereof.

6. Overvoltage arrester according to claim 1, wherein the cap forming said second spark gap electrode and said first spark gap electrode have oppositely disposed surfaces formed thereon, and at least one of said surfaces is roughened.

7. Overvoltage arrester according to claim 1, wherein said cap has an inner surface and said first spark gap electrode has a surface disposed opposite said inner surface, and including a thin graphite layer disposed on at least one of said surfaces.

8. Overvoltage arrester according to claim 1, including a tubular holder, said contact springs having outer surfaces in the form of means for centering the overvoltage arrester in said holder.

9. Overvoltage arrester according to claim 1, wherein said tubular insulator body has an inner wall, and including at least one coating of electrically conductive material serving as a firing bar disposed on said inner wall and extended from said first spark gap electrode toward the oppositely disposed other of said overvoltage arrester electrodes.

* * * * *